(12) United States Patent
Kern et al.

(10) Patent No.: US 6,896,829 B2
(45) Date of Patent: May 24, 2005

(54) METHOD OF MANUFACTURING A COMPOSITE DISC STRUCTURE AND APPARATUS FOR PERFORMING THE METHOD

(75) Inventors: Ellis E. Kern, Waverly, PA (US); William R. Mueller, Dalton, PA (US)

(73) Assignee: WEA Manufacturing, Inc., Olyphant, PA (US)

( * ) Notice: Subject to any disclaimer, the term of this patent is extended or adjusted under 35 U.S.C. 154(b) by 0 days.

(21) Appl. No.: 10/096,606

(22) Filed: Mar. 13, 2002

(65) Prior Publication Data

US 2003/0173689 A1 Sep. 18, 2003

(51) Int. Cl.$^7$ .......................... B29D 11/00; B29D 17/00
(52) U.S. Cl. ...................... 264/1.33; 156/230; 156/538; 264/1.7; 425/810
(58) Field of Search ................................ 264/1.33, 1.7, 264/106, 107; 425/810; 156/230, 232, 233, 240, 538

(56) References Cited

U.S. PATENT DOCUMENTS

| | | |
|---|---|---|
| 5,602,815 A | 2/1997 | Klappert et al. |
| 5,737,298 A | 4/1998 | Suhan |
| 5,900,098 A | 5/1999 | Mueller et al. |
| 5,932,051 A | 8/1999 | Mueller et al. |
| 5,949,752 A | 9/1999 | Glynn et al. |
| 5,997,976 A | 12/1999 | Mueller et al. |
| 6,117,284 A | 9/2000 | Mueller |
| 6,124,011 A | 9/2000 | Kern |
| 6,160,787 A | 12/2000 | Marquardt, Jr. et al. |
| 6,161,179 A | 12/2000 | Seidel |
| 6,309,496 B1 | 10/2001 | Van Hoof |

OTHER PUBLICATIONS

International Search Report dated Jun. 11, 2003; Application No. PCT/US03/07536 filed Mar. 13, 2003; Method of Manufacturing a Composite Disc Structure & Apparatus for Performing the Method: Inventor: Kern Ellis F.

*Primary Examiner*—Mathieu D. Vargot
(74) *Attorney, Agent, or Firm*—Gottlieb, Rackman & Reisman, P.C.

(57) ABSTRACT

A method of making composite discs continuously, including forming for each disc a first, a second layer, and a third support layer, each support layer being disc shaped and having a first surface with information indicia. An information layer is added to each support layers respectively. The said first and third support layers are positioned in a facing relationship, with the first and third information layers being adjacent. The third support layer is then separated from the third information layer, which thus remains attached to the first support layer. The first and second support layers are then joined. These steps are performed on a manufacturing line with conveyor belts transferring the support layers from station to station.

17 Claims, 4 Drawing Sheets

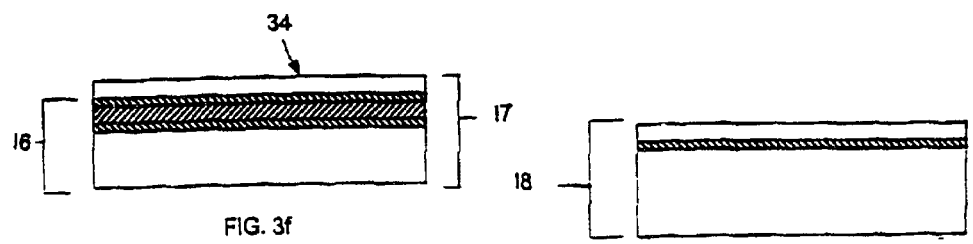
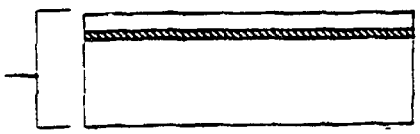
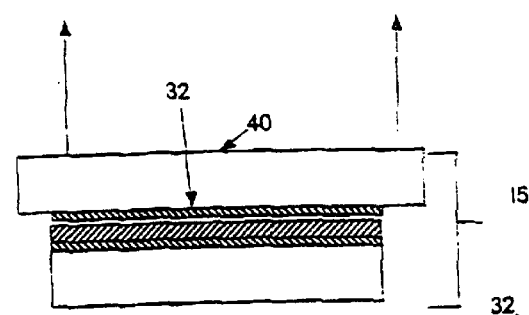
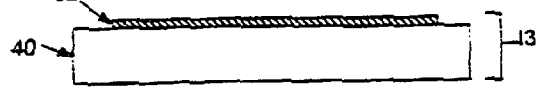
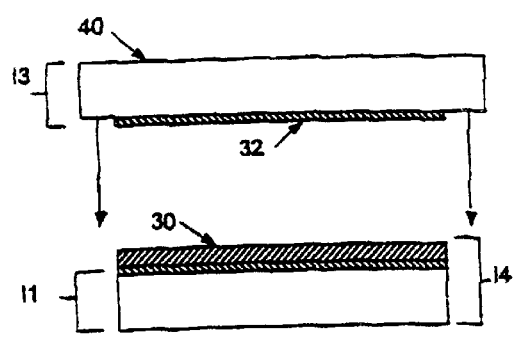
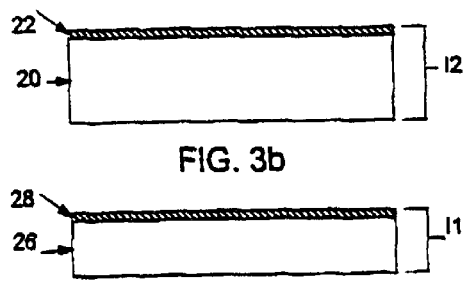
FIG. 3f
FIG. 3g
FIG. 3e
FIG. 3c
FIG. 3d
FIG. 3b
FIG. 3a

METHOD OF MANUFACTURING A COMPOSITE DISC STRUCTURE AND APPARATUS FOR PERFORMING THE METHOD

BACKGROUND OF THE INVENTION

A. Field of Invention

This invention pertains to a method of manufacturing multilayer discs, such as DVD/CD discs and the like, and more particularly, to a method and apparatus in which the various subassemblies or components of multilayer discs are made and assembled in a continuous manner.

B. Description of the Prior Art

Early optical discs, such as CD discs, were made with only a single information layer which was readable by a laser beam directed through one surface of the disc. Novel techniques were used to extend the capacity of discs. High capacity discs are now available, which may have several information layers, each layer being readable by a laser from one surface of the disc. These high capacity discs are known as DVDs and are available in several flavors, such as DVD-5, DVD-9 and so forth, indicating a nominal capacity of 5 Gb, 9 Gb, etc.

Several types of DVDs are also made that are laser readable on both sides including dual layer DVD/single layer DVD (DVD-14); dual layer DVD/dual layer DVD (DVD-18); Single layer/CD (DVD +); and dual layer DVD/CD. These discs are constructed by making two separate substrates, each substrate having at least one information layer (using either a CD or a DVD format) and then bonding the two substrates together, back to back. However, until now all these types of DVDs could only be made in a batch mode. This operation is slow, labor intensive and therefore expensive.

OBJECTIVES AND SUMMARY OF THE INVENTION

It is an objective of this invention to provide a method of making multilayered discs of the kind having information layer on two sides, wherein said discs are made in a continuous fashion.

A further objective is to provide a method and apparatus in which mulitlayered discs are made on a continuously moving assembly line.

Yet another objective is to provide a method for continuously making discs which can be performed without making major and extensive changes in existing equipment.

Yet a further objective is to provide a method and apparatus that can be used to make different kinds of discs, including DVD/CD discs. DVD/DVD discs, etc.

Other objectives and advantages of the invention shall become apparent from the following description.

Briefly, the discs are manufactured using in a continuous manner on a manufacturing line, with each disc being made using the following sequence of steps. The first step includes forming for each composite disc at least three support layers, each support layer having a support layer surface formed with information indicia. Next, an information layer on each of said support layer surfaces. The information layer from one of the support layers is transferred to the information layer of another support layer. Finally, the other support layer (which now has now two information layers) is attached to the third support layer, in a back-to-back relation. A spacer layer is added between the two information layers that are mounted on the same substrate. In addition a protective layer is added on the bottom of some of the information layers. The two support layers of the final disc can then be joined by bonding the surfaces with the protective layers.

The manufacturing line for manufacturing a plurality of composite discs continuously includes a first injection press adapted to form a plurality of first and second support layers; and a second injection press adapted to form a plurality of third support layers, each of the layers having a top surface with information indicia and a bottom surface. The manufacturing line further includes an information layer station receiving the support layers and forming information layers on the support layers. A joining station is arranged to receive and join the first and third support layers temporarily, with the respective information layers being positioned in a facing relationship. A separating station is adapted to receive the joined support layers and to separate the third layer while leaving the respective information layer of the third layer attached to the first support layer. Finally a bonding station is adapted to receive the first support layers with two information layers and said second support layers and to bond is them into composite disks. Preferably transport means, including conveyor belts, are used to transport the support layers between the stations of the manufacturing line. The line also includes a protective layer station adapted to add a protective layer to the support layers.

BRIEF DESCRIPTION OF THE DRAWINGS

FIG. 2 shows a block diagram of an assembly line used to make composiute DVD/CD discs of the type shown in FIG. 1a;

FIGS. 3a–3g show cross sectional views of various intermediate discs during the manufacturing process; and FIG. 4 shows a flow chart describing the process used to generate continuously a plurality of composite discs, each disc being similar to the one shown in FIG. 1a.

DETAILED DESCRIPTION OF THE INVENTION

Figure 1A:
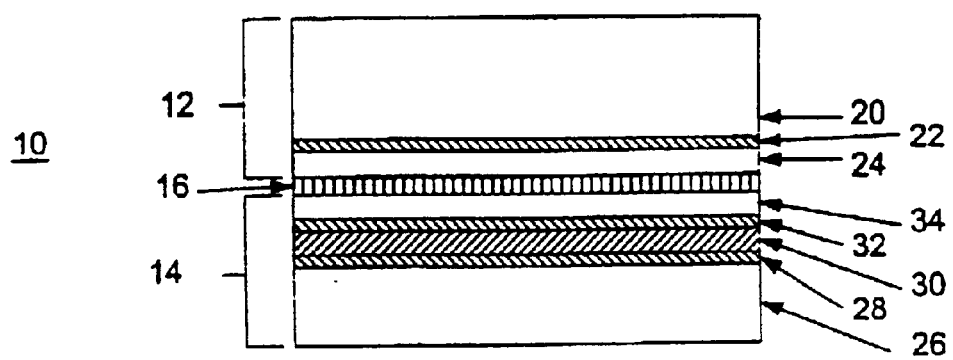
FIG. 1a shows a somewhat diagrammatic cross-sectional view of a composite DVD/CD disc constructed in accordance with this invention, with the DVD substrate being a multi-layered substrate.

FIG. 1a shows a DVD/CD composite disc 10. Disc 10 has a diameter of about 12 cm and is formed of two substrates 12 and 14 joined by a bonding layer 16. In the embodiment of FIG. 1a, substrate 12 is the CD substrate, substrate 14 is the DVD substrate. The CD substrate 12 is about 1000 microns thick and the bonding glue is about 50 microns thick. The thickness of the DVD component depends on its number of information layers. A DVD-5 substrate has only a single information layer and is about 600 microns thick resulting in a disc having an overall thickness of about 1,650 microns (obviously FIG. 1a is not to scale). This thickness is compatible with most DVD and CD players, and, accordingly, a disc with a DVD-5 substrate can be played by most of these players. However, a standard DVD-9 substrate has a thickness of about 1200 microns. If such a substrate were used for a composite disc, the overall thickness of the disc would be 2250 microns, which would not be useable in most CD or DVD players. Accordingly, in the present invention, the DVD substrate 14 is a dual layer DVD-9 substrate having a special structure as disclosed in U.S. Pat. No. 6,117,284 (the '284 patent), incorporated herein by reference. The resulting composite disc is only 1680 microns, still well within the limits of most players.

Therefore preferably, the DVD substrate 14 is a high data capacity, i.e., it's a DVD-9 or higher, but has the special structure disclosed in the '384 patent.

As shown in FIG. 1*a*, CD substrate 12 is formed of a transparent support layer 20, an information layer 22 and a protective layer 24. The information layer 22 is formed with various surface pits and land areas in accordance with the standard CD specifications, and referred to herein as information indicia. These indicia have been omitted for the sake of clarity.

The DVD substrate 14 is formed of the following layers:
a transparent support layer 26;
a first information layer 28;
a spacer layer 30;
a second information layer 32; and
a protective layer 34.

Information layers 28 and 32 also include information indicia formed in accordance with standard DVD specifications, which again have been omitted for the sake clarity. Information layer 28 is semi-transparent, to allow a laser beam (not shown) to read the second information layer 32.

The two transparent support layers 20, 26 allow a laser beam to be directed to the respective information layers in a manner well known in the art.

The spacer layer 30 is also an adhesive layer used to secure the information layer 32 during manufacturing, as discussed in more detail below.

Figure 2:
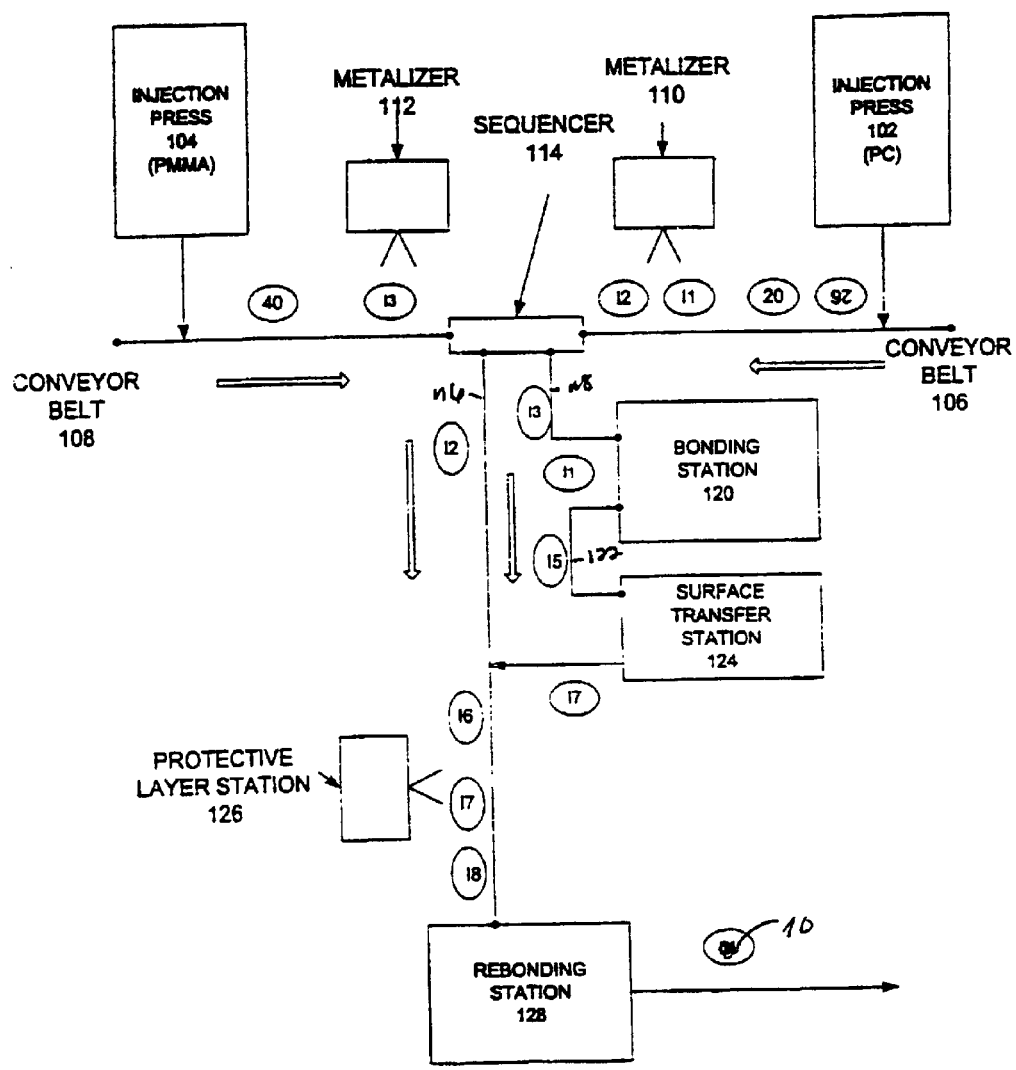

FIG. 2 shows schematically the elements of a disc manufacturing line 100 used to make a dual layer disc in accordance with this invention. The manufacturing line consists of several stations, each station being provided with apparatus designed to perform a specific function. Discs are transported from one station to another by conveyor belts or other similar means known in the art. In the following description, the means for transporting discs are referred to as conveyor belts for convenience, it being understood that the transporting means may involve other mechanisms as well, including rotating wheels with slots for receiving discs, etc.

Figure 4:
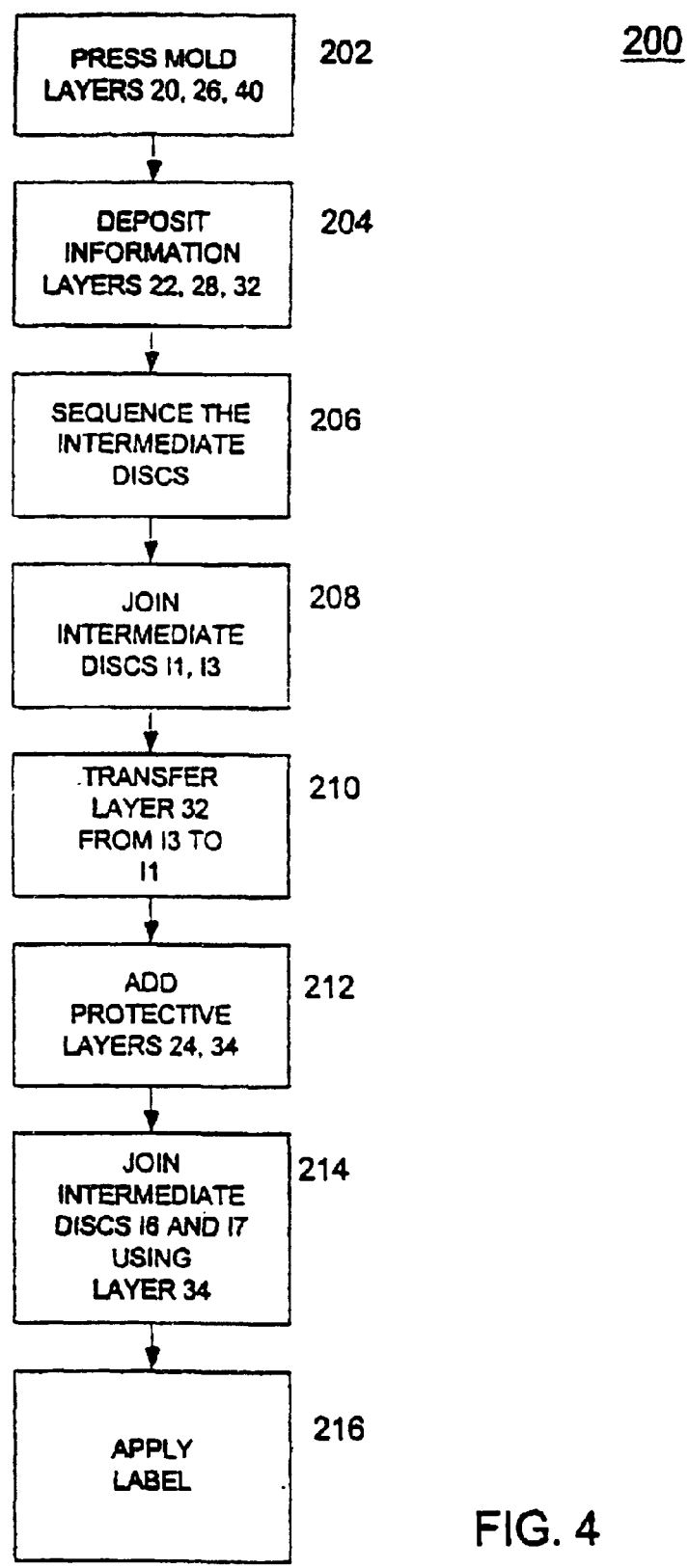

As indicated in FIG. 4, the first step 200 in the process is the making of three support layers: support layer 20 for the CD substrate 12, support layer 26 for the DVD substrate 14 and intermediate support layer 40 which is not incorporated in the final dual layer disc. These support layers are depicted in FIGS. 3*a*, 3*b* and 3*c*, respectively. Each of these support layers has a respective top surface that has information pit and land areas as described above. The support layers 20 and 26 are made of a transparent plastic material, such as polycarbonate (PC) while intermediate support layer 40 is made of polymethyl methacrylate (PMMA) or other similar material which does not bond well with materials used for the information layers, such as aluminum. The support layers 20, 26 are made in an injection press 102, which makes use of multi-cavity type device using two molds using techniques well known in the art. Intermediate support layer 40 is made by a separate injection press 104. Details of how these layers are made can be found in above-mentioned U.S. Pat. No. 6,117,284.

The support layers from injection press 102 are deposited on a conveyor belt 106 while the support layers 40 are deposited on a conveyor belt 108. Next, in step 204 the information layers 22, 28 and 32 are deposited on support layers 20, 26, 40, respectively, as shown in FIGS. 3*a*–3*c*, resulting in intermediate discs I1, I2 and I3, as shown. In FIG. 2, step 204 is accomplished by passing the support layers 20, 26 under a metalizer 110 by conveyor belt 106. Similarly, support layer 40 is passed under a metalizer 112 by conveyor belt 108. The metalizers 110, 112 deposit a reflective metallic layer, made for instance of aluminum, using sputtering or other similar techniques.

The metallized layers are shown in FIGS. 3*a*–3*b* and are designated as intermediate discs I1, I2 and I3.

Next, the intermediate discs are fed to a sequencer 114. The purpose of the sequencer 114 is to align the intermediate discs in a particular sequence (step 206) on two separate conveyor belts 116, 118. Conveyor belt 116 is used to carry intermediate discs I2 and conveyor belt 118 carries intermediate discs I1 and I3.

Discs I1 and I3 are fed to a bonding station 120 where the two discs are joined (step 208). For this purpose, the spacer layer 30 is applied to the layer 28 of each disc I1 resulting in an intermediate disc I4. Before the material of this layer is set, or hardens, the intermediate disc I3 is applied to or pressed against I1 with the spacer layer 30 being in intimate contact with layer 32, as shown in FIG. 3*d*. The resulting intermediate disc I5 has five layers as shown in FIG. 3*e*. Discs I5 are carried to the next station, which is a surface transfer module, by a conveyor belt 122.

Surface transfer module 124 is used to finalize the transfer of information layer 32 so that it remains joined to the spacer layer 30 (step 210). This process is facilitated by the material of support layer 40 which does not stick to the metallic layer 32. Between steps 204 and 210, information layer 32 is maintained on support layer 40 by adhesion caused by molecular roughness at the interface between these layers. In step 210, the intermediate support layer 40 is separated and pulled away from information layer 32, as shown in FIG. 3*e*. The support layer can now be discarded, or reused to make and carry another information layer. The result is a four-layer intermediate disc 16 which is deposited on conveyor belt 116.

Next, in step 212 protective layers 24 and 34 are added to intermediate discs I2, I6 using protective layer station 126. The resulting intermediate discs I7, I8, shown in FIGS. 3*f* and 3*g* respectively.

Figure 1B:
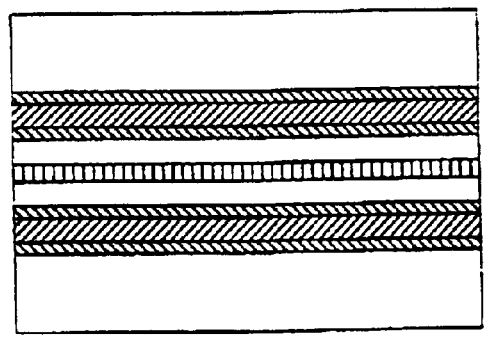
FIG. 1b shows a somewhat diagrammatic cross-sectional view of a composite DVD/DVD disc constructed in accordance with this invention, with at least one of the DVD substrates being a multi-layered substrate.

In step 214 the discs I7, I8 are provided to a rebonding station 128. At this station, the two intermediate discs I7 and I8 are joined by bonding layer 16. The end result of step 214 is dual layer disc 10. From station 128 the discs 10 are transferred to other stations(not shown) for labeling (step 216) and/or other finishing processes. Thus, the manufacturing line 100 is capable of producing dual layer discs having the structure indicated in FIG. 1*a* in a continuous manner. Obviously other types of discs may be made as well, using a manufacturing line having the appropriate stations, as required. For example, FIG. 1*b* shows a cross-sectional view similar to FIG. 1*b* with a composite DVD/DVD disc. In this case, the discs made of PC are made by one injection press similar to press 102, PMMA discs are made by a second injection press similar topress 104, all the discs are coated with a reflective material, and then joined as described above.

Obviously numerous modifications can be made to this invention without departing from its scope as defined in the appended claims.

What is claimed is:

1. A method of making composite discs continuously, the method comprising:

forming a first and a second support layer, each said first and second support layers being disc shaped and having a first surface with information indicia and a second surface;

forming a third support layer, said third support layer having a first surface with information indicia and a second surface;

adding a respective first, second and third information layer to said first, second and third support layers to form respective first, second and third intermediate discs;

transporting said first and second intermediate discs in an alternating sequence to a sequencer;

transporting said third intermediate discs to said sequencer;

forming with said sequencer a first sequence of discs consisting of alternating first and third intermediate discs;

feeding said first sequence to a transfer station;

positioning each first and third intermediate disc at said transfer station with said first and third support layers being arranged in a facing relationship, with said first and third information layers being adjacent;

separating said third support layer from said third information layer to form a fourth intermediate disc; and joining said second and said fourth intermediate discs.

2. The method of claim 1 wherein said method is performed on a manufacturing line including a plurality of stations, wherein each station is devoted to performing one of said steps of said method.

3. The method of claim 1 further comprising providing protective layers on said second and fourth intermediate discs.

4. The method of claim 1 wherein said first and second support layers are made of a first material and said third support layer is made of a second material different from said first material.

5. The method of claim 4 wherein said second material is not adhesive to said information layers.

6. A manufacturing line for manufacturing plurality of composite discs continuously comprising:

a first injection press adapted to form a plurality of first and second support layers;

a second injection press adapted to form a plurality of third support layers, each said layers having a top surface with information indicia and a bottom surface;

a first transporter transporting said first and second support layers;

a second transporter transporting said third support layers;

a first information layer station receiving said first and second support layers and forming on said first and second support layers information layers;

a second information layer station receiving said third support layers and adding information layers;

a sequencer receiving said first, second and third support layers, and arranging them in two sequences, including a first sequence formed of alternating first and third layers and a second sequence including said second layers:

a joining station arranged to receive the layers of said first sequence to join said first and third support layers temporarily, with the respective information layers being positioned in a facing relationship;

a separating station adapted to receive the joined support layers and adapted to separate said third layer while leaving the respective information layer of the third layer attached to the first support layer; and a bonding station adapted to receive said first support layers with two information layers and said second support layers and to bond them into composite discs.

7. The manufacturing line of claim 6 further comprising a third transport means adapted to transport said first sequence and a fourth transporter adapted to transport said second sequence.

8. The manufacturing line of claim 6 further comprising a protective layer station adapted to add a protective layer to said support layers.

9. The manufacturing line of claim 6 wherein said first and second information layer stations deposit metallic information layers on said respective support layers.

10. The manufacturing line of claim 9 wherein said first injection press forms said support layers from a material that adheres sufficiently to the information layers to prevent separation therefrom.

11. The manufacturing line of claim 10 wherein said first injection press forms said support layers out of a polycarbonate.

12. The manufacturing line of claim 9 wherein said first injection press forms said support layers from a material that adheres purely to the information layers to allow the separation of the third information layer from the third support layer at said separation station.

13. The manufacturing line of claim 10 wherein said second injection press forms said support layer out of a polymethyl methacrylate.

14. A method of making a multi-layered optical disc comprising:

forming a plurality of first and second data intermediate discs;

forming a plurality of third intermediate discs, said first, second and third intermediate discs each having a single information layer deposited on respective support layer;

feeding said first and third intermediate discs in an alternating sequence to a transfer station;

transferring at said transfer station the information layer from said third intermediate disc to the first intermediate disc to form a fourth intermediate disc with two information layers; and bonding said fourth intermediate disc to the second intermediate disc back-to-back.

15. The method of claim 14 further comprising adding a spacer layer between the information layers of said first and third intermediate discs.

16. The method of claim 14 wherein said support layers each have a top and a bottom surface, with said information layers add to said top surfaces, further comprising adding a protective layer on said bottom surfaces of said first and said fourth intermediate discs.

17. The method of claim 16 further comprising adding a bonding layer at said bonding station to join said protective layers.

* * * * *